United States Patent [19]
Withers

[11] 3,902,941
[45] Sept. 2, 1975

[54] CRYOGENIC TANK DESIGN AND METHOD OF MANUFACTURE

[76] Inventor: Daniel D. Withers, 701 N. Post Oak, Houston, Tex. 77002

[22] Filed: Apr. 17, 1973

[21] Appl. No.: 351,948

Related U.S. Application Data

[62] Division of Ser. No. 103,723, Jan. 4, 1971, Pat. No. 3,765,558.

[52] U.S. Cl. ............... 156/79; 156/290; 156/257; 229/9 F; 229/9 LG; 264/45
[51] Int. Cl. ............................................ B32b 31/10
[58] Field of Search ............ 229/9 F, 9 LG; 156/78, 156/79, 30 L, 257, 290; 264/45

[56] References Cited
UNITED STATES PATENTS

| | | | |
|---|---|---|---|
| 3,272,373 | 9/1966 | Alleaume et al. | 220/9 F |
| 3,400,849 | 9/1968 | Pottier et al. | 220/9 |
| 3,416,691 | 12/1968 | Piker | 220/9 F |
| 3,557,992 | 1/1971 | Reeves | 220/9 F |
| 3,650,872 | 3/1972 | McKiernan | 156/304 |
| 3,792,141 | 2/1974 | Offutt | 156/79 X |

*Primary Examiner*—Edward G. Whitby

[57] ABSTRACT

A vessel and method of manufacture of such vessel is provided for containment of a low temperature or cryogenic fluid. The wall of the vessel may be of a sandwich construction comprising a first layer of fiber reinforced polymer, a layer of gas expanded polymer foam and a second layer of fiber reinforced polymer similar to the first layer. Variations of the basic sandwich construction may be provided. The method of construction comprises a sandwich construction having a predetermined configuration to allow construction of a vessel having a cylindrical configuration, for example. The sandwich construction of the present invention allows suitable bonding of sections with a mixture of reinforcing fiber and polymer.

11 Claims, 7 Drawing Figures

PATENTED SEP 2 1975 3,902,941

CRYOGENIC TANK DESIGN AND METHOD OF MANUFACTURE

This application is a division of Ser. No. 103723, filed on Jan. 4, 1971, and now U.S. Pat. No. 3,765,558.

BACKGROUND OF THE INVENTION

1. Field of the Invention

The present invention relates to a vessel adapted for containing low temperature or cryogenic material and the method of manufacture of such vessel.

2. Description of the Prior Art

In the field of containment and movement of low temperature material or fluid particularly in the storage and shipment of liquefied petroleum products, problems have been presented for which there has been no known and simple solution. Containment and shipment of low temperature or cryogenic materials has been limited to vessels having exotic materials since the housing for such vessels, the wall thickness and construction techniques utilized in such known vessels, have presented many problems so that no effective, simple, light and economical vessel has been developed to provide the results of the present invention.

SUMMARY OF THE INVENTION

The present invention is directed toward a vessel particularly adapted for containment and shipment of low temperature or cryogenic fluid or other material. The vessel structure of the present invention includes a sandwich configuration wherein a fiber-reinforced polymer "FRP" material is in contact with the low temperature or cryogenic fluid, a gas-expanded polymer foam ("foam") material layer is disposed adjacent to and bonded to such fiber-reinforced polymer ("FRP") material and a second fiber-reinforced polymer ("FRP") coat is disposed on the exterior and bonded to the polymer foam layer. Variations of the sandwich configuration may be provided depending upon the requirements of a particular application, the wall strength required, and whether a metal outer wall structure is available. The method of the present invention comprises the steps of preparing the sandwich construction and may include a suitable mandrel or mold on which the sandwich construction is constructed.

DETAILED DESCRIPTION OF THE DRAWINGS

Figure 1:
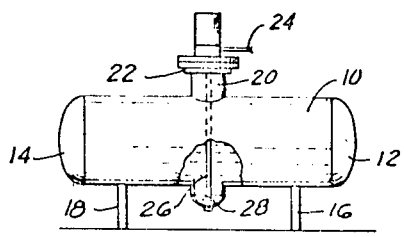
FIG. 1 is a side elevational, partial sectional view of a vessel incorporating the present invention.

FIG. 1 is a side elevational, partial sectional view of a vessel wherein the present invention may be utilized. Vessel 10 has ends or headers 12 and 14 positioned on the main cylindrical body. Suitable support means such as support 16 and support 18 are used to support and stabilize the vessel 10. A pipe or coupling member 20 may be positioned on the upper portion of vessel 10 with a suitable flange member 22 coupled to member 20. Connection 24 is in communication with pipe 26 which is coupled to a pump 28 which may be located in the bottom or well portion of the vessel 10.

It will be appreciated that the present invention is directed toward liquified petroleum products wherein such products may have been gasified during transportation of the products. The liquified petroleum products which are contemplated for storage and for transportation in vessels of the present invention may have a temperature range of approximately 0°F. to −100°F. The vessels shown in FIG. 1 may be utilized on a floating vessel, such as a ship, on a railroad car, on a truck, or other land vehicle, or on any other suitable vehicle such as an aircraft whereby transportation of liquified petroleum products or any cryogenic material may be achieved.

Figure 2:
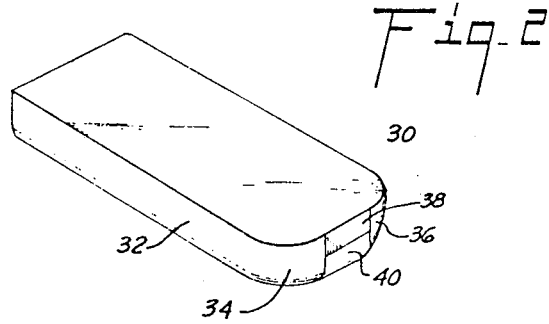
FIG. 2 is a perspective top view of a barge incorporating the present invention.

FIG. 2 is a perspective top view of a barge constructed pursuant to the present invention. The upper portion 30 of the barge has a side member 32 having a curved portion 34 coupled thereto. Another curved portion 36 also is coupled to the upper portion 30 of the barge.

Member 38 is a flat panel and member 40 is a curved member coupled thereto. It will be appreciated that the curved surfaces such as curved portion 34 and curved portion 36 reduce the amount of friction on the barge as it is pulled or pushed through a body of water.

Figure 3:
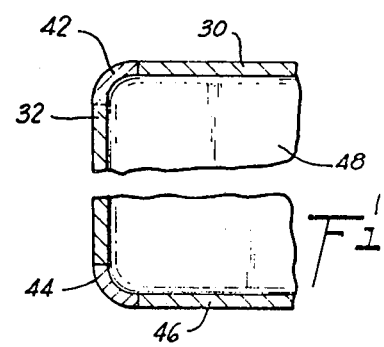
FIG. 3 is a cross-sectional, elevational view of the edge of the barge shown in FIG. 2.

FIG. 3 is a cross-sectional, elevational view of the edge of the barge shown in FIG. 2 showing in greater detail the construction of the barge. Upper member 30 is joined to side member 32 through corner member 42 and corner member 44. The bottom member 46 is shown joined to curved member 44. The space 48 may be utilized for storage of cryogenic materials such as liquified petroleum products. The method of manufacture of the barge will be explained subsequently in detail in accordance with the objectives and the purpose of the present invention.

Figure 4:
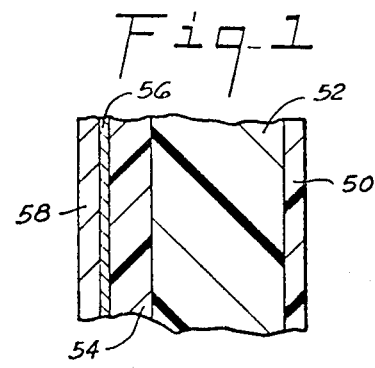
FIG. 4 is a cross-sectional view of a sandwich construction of the present invention.

FIG. 4 is a cross-sectional view of the sandwich construction of the present invention. An inner barrier 50 may be constructed of fiber-reinforced polymer with polymer foam 52 positioned adjacent the fiber-reinforced polymer inner barrier 50. A fiber-reinforced polymer outer barrier 54 is positioned between polymer foam 52 and a mold release agent 56. A mold release agent is positioned on a metal member 58. Thus it will be apparent in viewing FIG. 4 that a metal member 58 which may be a mandrel has positioned thereon a mold release agent 56 which is coupled to a fiber-reinforced polymer outer barrier 54. A polymer foam is positioned between the fiber-reinforced polymer outer barrier 54 and the fiber-reinforced inner barrier 50. By way of example and not by limitation, a glass fiber-reinforced epoxy or polyester material may be utilized as the fiber-reinforced polymer inner and outer barriers. The polymer foam may be a fluro-carbon expanded polyurethane foam, for example. In the method of construction utilized in connection with the sandwich construction shown in FIG. 4, a layer of fiber-reinforced polymer would be formed. When the layer of fiber-reinforced polymer has hardened, a viscous polymer mixed with a liquid gas would be applied to the layer of fiber-reinforced polymer to provide a polymer foam which must contain a material with high adhesive qualities or must itself be adhesive to the fiber-reinforced polymer. When the polymer foam has been applied, the liquid gas which was mixed with the polymer foam vaporizes causing the foam to expand as it hardens. The density of the foam is regulated by the proportion of the materials in the mixture. A final layer of fiber-reinforced polymer is provided and comprises reinforcing fibers and a polymer having an adhesive quality to the previously applied polymer foam. The final layer is applied after the foam has hardened partially but while the surface of the polymer foam is tacky to promote a good bond between the materials. A mandrel may be utilized to shape the sandwich construction. The component materials may be fabricated in flat or curved panels to allow erection of structures which would be too large for the use of mandrels.

Figure 5:
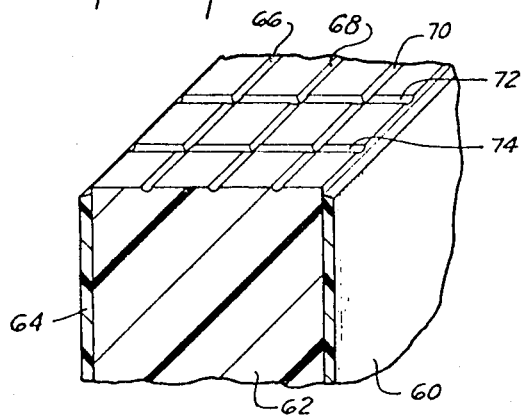
FIG. 5 is a sectional, perspective view of a member grooved prior to being joined together in a manner set forth in the present invention.

FIG. 5 is a sectional, perspective view of a grooved sandwich construction section of the present invention adapted for joining to another section. A fiber-reinforced polymer 60 has polymer foam 62 positioned between fiber-reinforced polymer 60 and fiber-reinforced polymer 64. Grooves 66, 68 and 70 may be provided within foam 62 and grooves 72 and 74 may be perpendicular to grooves 66, 68 and 70.

Figure 6:
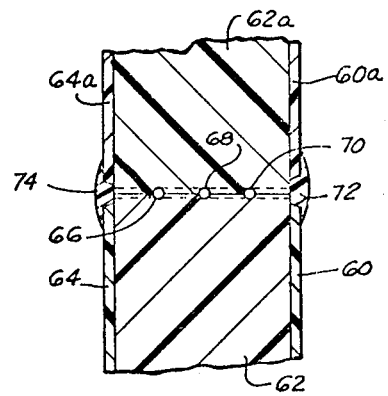
FIG. 6 is a sectional view of two members joined together pursuant to the present invention.

FIG. 6 is a sectional view showing the bonding of two sections such as the section shown in FIG. 5. A member having fiber-reinforced polymer 60 and fiber-reinforced polymer 64 having foam 62 therebetween is joined to a similar member having fiber-reinforced polymer 60A, foam 62A and fiber-reinforced polymer 64A. The grooves 66, 68 and 70 have been filled with a low-density foam. A mixture of reinforcing fiber and polymer is utilized as a weld 72 and weld 74. The weld in the grooves is provided in the inner bond by pumping "foam-in-place" polymer into the grooves so that there is a bonding when the polymer foam hardens. The outer welds are provided by spraying a compatible fluid fiber-reinforced polymer mixture to bond the two panels when the weld hardens.

It will be appreciated by those skilled in the art that the type of fiber-reinforced polymer and the foam may vary in accordance with the tensile strength requirements and other engineering requirements of a particular vessel design without departing from the spirit of the present invention.

Figure 7:
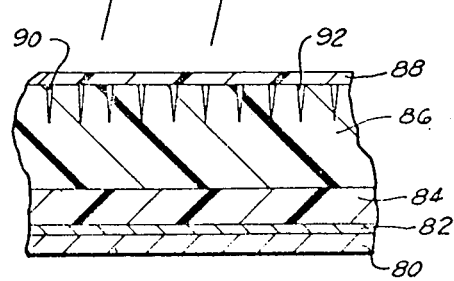
FIG. 7 is a sectional view of an alternate type of structure of the present invention.

FIG. 7 is a sectional view of another form of construction of the present invention showing a metal member 80 having a mold release agent 82 positioned thereon. A fiber-reinforced polymer outer barrier 84 is positioned on the mold release agent 82 and a polymer foam 86 is positioned between fiber-reinforced outer barrier 84 and fiber-reinforced polymer inner barrier 88 as was explained in connection with FIG. 4. A plurality of sawed slots such as slot 90 and slot 92 may be provided in the hardened polymer foam prior to the positioning of the fiber-reinforced polymer inner barrier 88 on the polymer foam 86 to allow for contraction and expansion of the fiber-reinforced polymer inner barrier 88. The slots such as slot 90 and slot 92 are temperature and volume compensators for the inner barrier to prevent destruction of the sandwich construction during extreme temperature ranges which are encountered by the fiber-reinforced polymer inner barrier 88 in the practising of the present invention. It will be appreciated that the specific gravity of the vessels provided by the sandwich construction of the present invention will have a specific gravity which will allow the vessels to float even when filled with cryogenic material. Also, it will be appreciated that the panels which are joined by welding are joined without heat.

Thus the present invention provides a method of construction, a product by process, and a structure capable of use to provide a vessel which will contain cryogenic materials for storage or transportation of such cryogenic materials.

I claim:

1. A method of constructing a material for storing cryogenic matter, said method comprising the steps of
    fabricating first and second sections of a fiber-reinforced polymer,
    positioning said sections in a spaced position to each other, and
    injecting polymer foam in the space between said sections so that said sections are bonded to said polymer foam as it dries.

2. The method of claim 1 wherein said sections are positioned substantially parallel to each other.

3. The method of claim 1 and further including the steps of positioning said sections in substantially the same plane, and joining said sections to each other with a polymer and a mixture of polymer and reinforcing fiber.

4. A method of constructing a vessel for storing cryogenic material, said method comprising the steps of
    fabricating a first panel section of fiber-reinforced polymer having a foam layer portion bonded to a first surface thereof, and
    bonding a second section of fiber-reinforced polymer to the other surface of said foam layer portion.

5. The method of claim 4 and further including the additional step of slotting said bonded foam portion prior to bonding of said second section of fiber-reinforced polymer to the slotted foam portion.

6. A method for constructing containment material for storage of fluids in the cryogenic temperature regime, the method comprising the steps of:
    fabricating a first rigid wall of polymer plastic, said wall having first and second sides,
    introducing a layer of expanded polymer foam against the first side of said first rigid wall,
    allowing said layer of expanded polymer foam to cure to a hardened state,
    producing a plurality of slots across the exposed surface of said layer of expanded polymer foam,
    fabricating a second rigid wall of polymer plastic having first and second sides, and affixing the first side of said second rigid wall to said exposed surface of said expanded polymer foam, said slots thus acting as temperature and volume compensators to prevent undue stress to said rigid sandwich structure during sequential exposure to alternative extreme high and low temperature ranges.

7. The method of claim 6 wherein said slots are produced in a direction perpendicular to the plain of said first rigid wall of polymer plastic so that the temperature and volume compensation function of such slots is conducted into the sandwich towards that second wall.

8. The method of claim 6 wherein said slots are produced so as to communicate with said second side of said first rigid wall.

9. The method of claim 8 wherein said slots are produced in a direction perpendicular to said second side of said first rigid wall of polymer plastic.

10. The method of claim 6 wherein a plurality of integral rigid sandwiched constructions are produced, producing a series of groove means in the end surfaces of the expanded polymer foam of each integral rigid sandwich construction, disposing one of said integral rigid walls in adjacent abutting relation and, aligning the groove means in the end surfaces of said rigid abutting walls of polymer plastic, introducing polymer foam in said groove means contacting each end surface of said abutting rigid walls to thereby fuse said walls together in a manner insuring similar expansion and contraction characteristics in the respective laminate components.

11. The method of claim 10 including the additional step of welding the first and second sides of adjacent abutting first and second rigid walls by applying polymer plastic beads to the rigid wall intersections so as to thereby insure similar expansion and contraction characteristics in the surface area of the respective laminate components.

* * * * *